US007818078B2

(12) United States Patent
Iriarte

(10) Patent No.: US 7,818,078 B2
(45) Date of Patent: Oct. 19, 2010

(54) INTERFACE DEVICE FOR WIRELESS AUDIO APPLICATIONS

(76) Inventor: Gonzalo Fuentes Iriarte, Parkstraat 108 4C, Leuven (BE) 3000

( * ) Notice: Subject to any disclaimer, the term of this patent is extended or adjusted under 35 U.S.C. 154(b) by 830 days.

(21) Appl. No.: 11/160,012

(22) Filed: Jun. 6, 2005

(65) Prior Publication Data

US 2007/0003073 A1 Jan. 4, 2007

(51) Int. Cl.
*G06F 17/00* (2006.01)

(52) U.S. Cl. ........................................................ 700/94

(58) Field of Classification Search .................... 700/94
See application file for complete search history.

(56) References Cited

U.S. PATENT DOCUMENTS

| | | | | | |
|---|---|---|---|---|---|
| 716,136 | A | | 12/1902 | Stone | |
| 1,526,308 | A | | 2/1925 | Kloneck | |
| 1,570,261 | A | | 1/1926 | Kloneck | |
| 1,715,701 | A | | 6/1929 | Fortescue | |
| 3,080,785 | A | | 3/1963 | Evans | |
| 3,085,460 | A | | 4/1963 | Edwards | |
| 3,296,916 | A | | 1/1967 | Palmer | |
| D212,006 | S | * | 8/1968 | Roberts | D14/155 |
| D215,661 | S | * | 10/1969 | Richards | D14/155 |
| 3,825,666 | A | | 7/1974 | Jaggers | |
| 3,901,118 | A | | 8/1975 | Ford | |
| 4,153,877 | A | * | 5/1979 | Fathauer et al. | 455/76 |
| 4,908,847 | A | * | 3/1990 | Hannon et al. | 455/74.1 |
| 5,025,704 | A | * | 6/1991 | Davis | 84/723 |
| 5,146,615 | A | * | 9/1992 | Hodsdon et al. | 455/90.3 |
| 5,375,260 | A | * | 12/1994 | Koike | 455/208 |
| 5,386,438 | A | * | 1/1995 | England | 375/377 |
| 5,404,577 | A | * | 4/1995 | Zuckerman et al. | 455/66.1 |
| 5,475,872 | A | * | 12/1995 | Sato | 455/550.1 |
| 5,680,441 | A | * | 10/1997 | Gallo | 455/74.1 |
| 5,771,441 | A | * | 6/1998 | Altstatt | 455/66.1 |
| 6,011,524 | A | * | 1/2000 | Jervis | 343/895 |
| 6,185,434 | B1 | * | 2/2001 | Hagstrom et al. | 455/552.1 |
| 6,198,034 | B1 | * | 3/2001 | Beach et al. | 84/600 |
| D463,391 | S | * | 9/2002 | Siokola | D14/155 |
| 6,619,969 | B2 | * | 9/2003 | Scheider et al. | 439/131 |
| 6,653,543 | B2 | * | 11/2003 | Kulas | 84/454 |

(Continued)

OTHER PUBLICATIONS

Motorola talkabout manual, copyright 2002 downloaded archive.org Jun. 29, 2009.*

*Primary Examiner*—Curtis Kuntz
*Assistant Examiner*—Paul McCord
(74) *Attorney, Agent, or Firm*—Sughrue Mion, PLLC

(57) ABSTRACT

The present invention is directed to wireless analog audio systems for transmission and reception of a signal from an electric analog audio signal-generating device to an electric analog audio signal-receiving device. One example of such a signal-generating device is an electric guitar. By using a transceiver, the guitar is adapted to generate analog audio signals, convert those signals into digital signals, format the digital signals according to a digital communication protocol, and to output the formatted signals. The guitar may include a novel multi-signal guitar pickup that generates some of the analog audio signals. The interface device of the present invention is adapted to wirelessly and in real time receive digital signals, convert those signals into analog signals representing what is being played at the guitar, and output the analog signals to a standard guitar amplifier. Moreover, the system presented here does not require any modification of standard guitar equipment.

27 Claims, 10 Drawing Sheets

U.S. PATENT DOCUMENTS 6,671,494 B1 * 12/2003 James ........................ 455/66.1
6,778,814 B2 * 8/2004 Koike .......................... 455/95
6,859,538 B1 * 2/2005 Voltz ........................... 381/77
6,946,592 B1 * 9/2005 Chick .......................... 84/322
6,996,377 B1 * 2/2006 Yamawaki et al. ............ 455/86
7,026,539 B2 * 4/2006 Pennock et al. ............... 84/662
7,065,162 B1 * 6/2006 Sorrells et al. .............. 375/343
7,072,475 B1 * 7/2006 DeNap et al. ................. 381/74
7,158,843 B2 * 1/2007 Smith .......................... 700/94
7,351,905 B2 * 4/2008 Ioffe ........................... 84/723
2003/0040205 A1 * 2/2003 Scheider et al. ............. 439/125
2003/0118196 A1 * 6/2003 Woolfork ..................... 381/74
2003/0172797 A1 * 9/2003 Juszkiewicz et al. .......... 84/601
2005/0130717 A1 * 6/2005 Gosieski et al. .......... 455/575.2
2005/0286734 A1 * 12/2005 Wang ......................... 381/381
2006/0012424 A1 * 1/2006 Peavey et al. ............... 330/118
2006/0116009 A1 * 6/2006 Langberg et al. ........... 439/76.1
2006/0132382 A1 * 6/2006 Jannard ......................... 345/8
2007/0003073 A1 * 1/2007 Iriarte ......................... 381/77
2008/0187141 A1 * 8/2008 Wang ............................ 381/3

* cited by examiner

INTERFACE DEVICE FOR WIRELESS AUDIO APPLICATIONS

BACKGROUND OF THE INVENTION

This invention relates to signal-generating devices as well as signal-receiving devices. More particularly, this invention pertains to systems that include jack plug or jack socket connections. The new audio transfer system uses standard audio jack plug or audio jack socket connections to connect an interface device which enables broadcasting an audio signal to a second interface device that will ensure the wireless reception of said audio signal.

Use of audio jack plugs or jack sockets with audio devices such as radio, tape players, CD players, mp3 players, computers, television audio, electric guitars, electric music keyboards, video cassette recorders (VCR) and the like, has been in use for many years. Such use includes the portable player systems such as cassette tape players that may be used during exercising as for example running. These systems usually incorporate an audio jack plug or an audio jack socket to which wire and connector connect a signal-receiving device.

There are also known wireless signal-receiving devices such as headphones that may receive radio transmissions. Also, some signal-generating devices such as mp3 players have been modified to allow wireless communication with a headphone receiver. However, the interface device presented here allows the use of a simple plug-in transceiver for connection of a standard signal-generating device jack plug (or socket) to a standard signal-receiving device jack plug (or socket) to effect wireless transmission and reception between these space-separated devices without requiring their prior modification. Because the interface device presented here is easily detachable, standard signal-generating and signal-receiving devices may be operated back in a non-wireless form if desired (due for instance to a run out of batteries).

Hence, there is a need for a simple connection system for existing signal-generating devices to allow wireless transmission to signal-receiving devices.

Further, there is a need for a simple connection system for existing signal-receiving devices to allow wireless reception from signal-generating devices.

Also, there is a need for a simple connection system for existing signal-generating devices to allow wireless transmission to signal-receiving devices by using transceivers, which improve towards an interference-free wireless transmission and reception between space-separated devices due to their capability to resend the non-properly received data.

Moreover, there is a need for portability and easy of use in interface devices that offer the possibility to convert conventional non-wireless audio devices into wireless audio devices.

Further, there is a need for interchangeability in interface devices that offer the possibility to convert conventional non-wireless audio devices into wireless audio devices, thus allowing the same set of interface devices to be used in any kind of audio devices such as electric guitars and amplifiers at one point in time and CD players and headphones at another point in time.

SUMMARY OF THE INVENTION

Digital audio signals are less susceptible to electrical and environmental noise because they can only take on discrete values and a system can be designed to ignore noise signal values that are not within a certain range of the discrete values. The benefits of digital signals with regard to noise resistance are well known in the art and will not be repeated here. It is sufficient to point out that digital signals have a discrete nature and it is that discreteness that provides the noise resistance.

The development of a digital electric guitar and the adoption of that guitar in the consumer marketplace however, creates an additional series of problems. First, a guitar that receives and outputs digital audio signals is incompatible with conventional guitar equipment, such as amplifiers, effects boxes, and synthesizers. These devices are adapted to receive and output analog audio signals, not digital audio signals. They cannot process digital audio signals.

This incompatibility creates a serious problem with regard to the adoption of a digital guitar in the consumer marketplace. Many consumers have invested a substantial amount of money in conventional guitar equipment and are unlikely to purchase a digital guitar that is incompatible with the conventional guitar equipment they already own, even if that guitar outputs audio signals that are more susceptible to noise. Thus, in addition to the need for a digital guitar, there is a need for a digital guitar that is compatible with conventional guitar equipment.

Second, many consumers may be unwilling to purchase a digital guitar because they are unwilling to give up their conventional analog guitar. For example, many consumers have used their conventional analog guitars for years and have become accustomed to the way those guitars look and feel. These consumers may be unwilling to begin using a digital guitar regardless of its benefits. While this problem might be overcome to some extent by fashioning the digital guitar to have an appearance similar to that of conventional analog guitars, this may not be sufficient for some consumers.

Furthermore, some consumers may be unwilling to replace their conventional analog guitar with a digital guitar because their guitar has significantly increased in value. Many conventional analog guitars have become very popular among consumers and, as a result, have increased in value. Consumers owning these types of guitars are very unlikely to sell these guitars in order to purchase a digital guitar or to use a digital guitar in place of their existing conventional analog guitar. Many of these consumers, however, still have a need for and would like to obtain the benefits provided by a digital guitar. As explained in detail in this application, one way to address this problem is to develop a method of modifying a conventional analog guitar so that it can receive and output digital audio signals.

The analog electric guitar interface device and the method of the present invention include the steps necessary to convert a conventional analog guitar into a digital guitar. The analog guitar outputs analog audio signals that are transferred wirelessly to the guitar amplifier system. Due to the use of transceivers, at the guitar amplifier system, an identical interface device allows the wirelessly transmitted digital signals to be compatible with conventional analog guitar equipment by converting the digital audio signals into analog audio signals.

By using the interface device of the present invention, the analog electric guitar is adapted to generate analog audio signals, convert those audio signals into digital audio signals, format the digital audio signals according to a predetermined digital communication protocol, and to output wirelessly the formatted signals.

Thus the interface device presented here is capable to receive external analog audio signals, convert those signals into digital signals, format the digital signals according to a predetermined digital communication protocol, and to output the formatted digital signals. In one exemplary embodiment, the Digital Signal Processor (DSP) of the interface device is used to transmit a Musical Instrument Digital Interface (MIDI) to the receiving device.

Further, the interface device is adapted to receive a plurality of different types of digital audio signals, to convert those signals into analog audio signals, and to output the analog audio signals to a signal-receiving device. The interface device is also adapted to receive digital control signals and to use these signals to control the outputs of the interface device.

To facilitate the above-referenced functions, the interface device includes a transceiver and a few external electric components to match the impedance of the analog signals coming out of a electric analog audio signal-generating device or going into a electric analog audio signal-receiving device.

Using transceivers, transmitting and receiving devices that are exactly the same, reduces manufacturing costs and improves the ease of use of embodiments of the present invention.

Hence, the interface device includes an analog input/output assembly and a processing circuit. These components work together to allow the interface device to perform its required functions.

The method includes the steps of connecting the interface device to the standard analog electric guitar jack socket and connecting another interface device to the standard guitar amplifier jack socket.

In another preferred embodiment, the method includes the steps of connecting the interface device to the standard analog electric-guitar jack socket, connecting another interface device to the standard analog input jack socket of a guitar multieffect module, connecting another interface device to the standard analog output jack socket of said guitar multieffect module and connecting another interface device to the standard electric guitar amplifier jack socket.

Accordingly, one object of the present invention is to provide a processing circuit for a guitar or other kind of signal generating device, that is capable of receiving analog signals, converting those signals into digital signals, formatting the digital signals according to a digital communication protocol, and outputting the formatted digital signals wirelessly.

Another object is to provide an interface device that is compatible with conventional electric guitar equipment.

Still another object of the present invention is to provide an interface device capable of receiving digital signals and converting them into analog signals.

These and other features, aspects and advantages of the present invention will become better understood with reference to the following drawings, description and claims.

LIST

1 Interface device
2 Multilayer Printed Circuit Board (PCB)
3 Single chip transceiver ICs for audio applications
4 6.3-mm jack plug
5 Few external components
6 Power On/Off switch
7 Matching impedance switch
8 Switch to change between transmission and reception operational mode.
9 Battery holder for AAA batteries
10 Housing
11 Upper casing for batteries replacement
12 6.3-mm jack socket
13 Cable
14 Standard 6.3, 3.5 or 2.5-mm audio jack-plug or standard 6.3, 3.5 or a 2.5-mm audio jack socket
15 Standard electric guitar of the prior art
16 6.3-mm input receptacle in a standard electric guitar (not shown)
17 Wireless link
18 Standard electric guitar amplifier
19 Guitar multieffect module
20 Headphone set
21 CD player
22 Transceiver board
23 Audio signal coming from an electric analog audio signal generating device
24 Audio signal going to an electric analog audio signal receiving device
25 Audio Low Noise Amplifier
26 Audio analog filter
27 Audio Analog to Digital Converter (ADC)
28 MCU (microcontroller unit)
29 DSP (Digital Signal Processor)
30 RF Transceiver of the prior art
31 Audio Digital to Analog Converter (DAC)
32 Audio Power Amplifier
33 ¼ monopole antenna printed on a Printed Circuit Board
34 Duplexer
35 RF Transceiver Low Noise Amplifier (LNA)
36 Down-conversion Mixer
37 RF Bandpass filter
38 Gain control
39 RF Transceiver Analog to Digital Converter (ADC)
40 Digital demodulator
41 Frequency synthesizer (PLL)
42 0-90 splitter
43 Digital interface
44 Digital modulator
45 RF Transceiver Digital to Analog Converter (DAC)
46 High Pass Filter
47 Up-conversion mixer
48 Summating element
49 Power amplifier (PA)
50 On-chip BIAS
51 Power Control Unit
52 Crystal oscillator
53 Balun
54 Audio codec

BRIEF DESCRIPTION OF THE DRAWINGS

The following figures provide a more complete understanding of the invention, especially when considered in light of the following written description and its technical advantages.

Referring to FIG. 3, a wireless digital audio system may be an interface device 1 consisting in the same components as the one shown in FIG. 1 with the exception that the 6.3-mm jack plug is now connected to the multilayer Printed Circuit Board (PCB) 2 by means of a cable 13 to improve the handling possibilities of the interface device 1.

DETAILED DESCRIPTION OF THE DRAWINGS

The following detailed description is the best currently contemplated mode for carrying out the invention. The description is not to be taken in a limiting sense, but is made merely for the purpose of illustrating the general principles of the invention.

Figure 1:
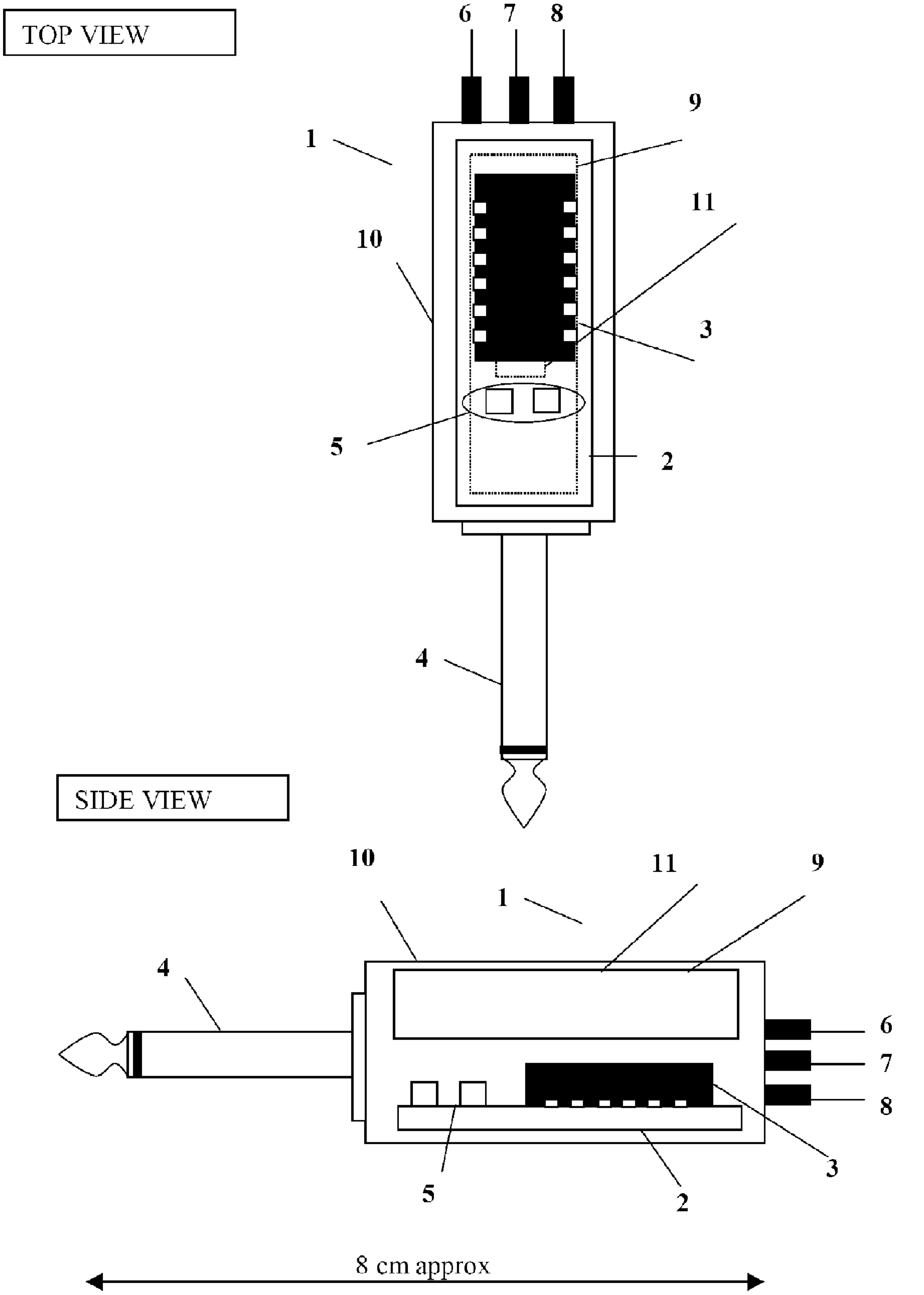
Referring to FIG. 1, a wireless digital audio system may be an interface device 1 consisting in a multilayer Printed Circuit Board (PCB) 2 single chip transceiver 3, 6.3-mm jack plug 4, few external components 5, power On/Off switch 6, matching impedance switch 7, switch to change between transmission and reception operational mode 8, battery holder for AAA batteries 9, and housing 10.

Referring to FIG. 1, a wireless digital audio system may be an interface device (1) consisting in a multilayer Printed Circuit Board (PCB) (2) single chip transceiver (3), 6.3" jack plug (4), few external components (5), power On/Off switch (6), matching impedance switch (7), switch to change between transmission and reception operational mode (8), battery holder for AAA batteries (9), and housing (10).

Figure 2:
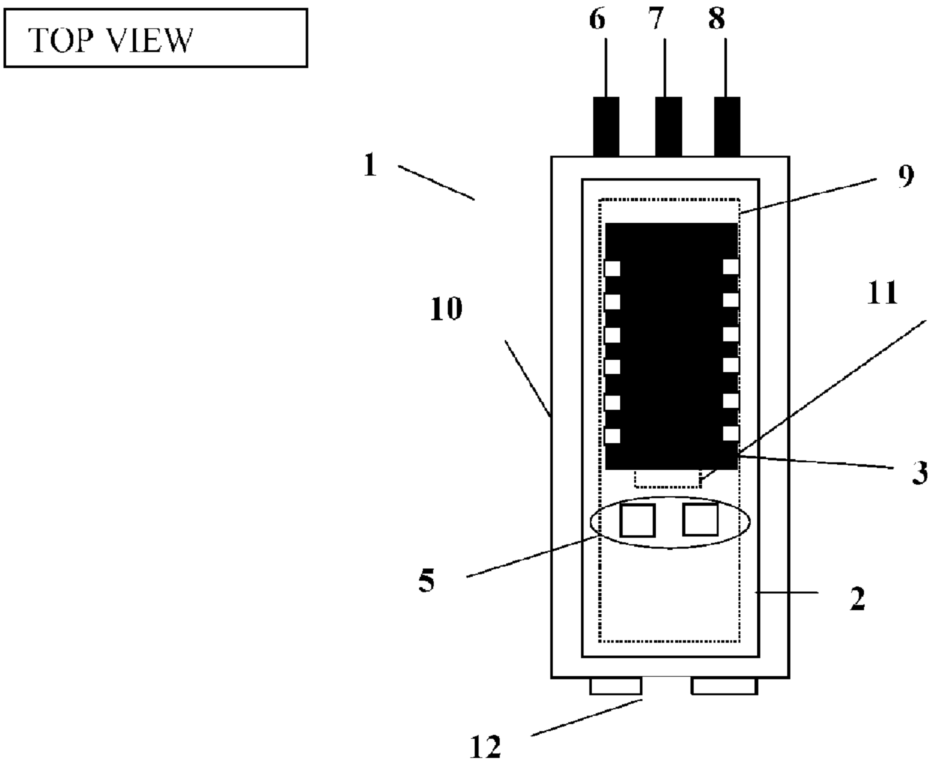
FIG. 2 shows a top view and a side view of another embodiment in accordance with the present invention illustrating an audio jack socket with a single chip transceiver system directly connected to it.
Figure 2:
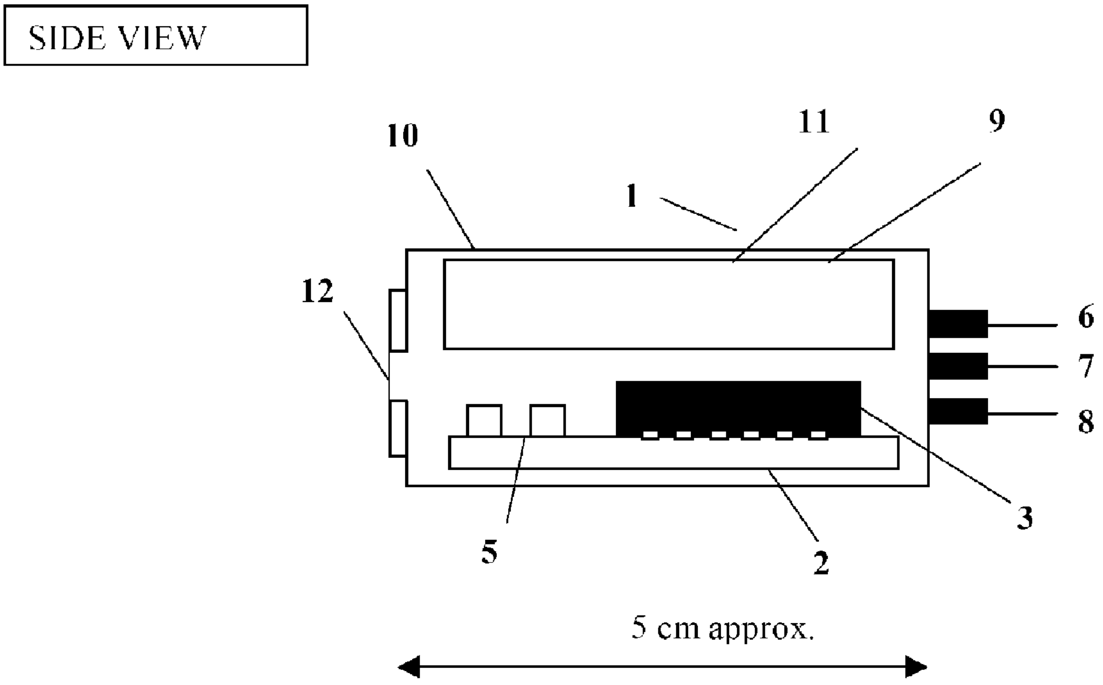

Referring to FIG. 2, a wireless digital audio system may be an interface device (1) consisting in the same components as the one previously shown in FIG. 1 with the exception that the 6.3-millimeter (mm) jack plug (4) has been replaced by a 6.3-mm jack socket (12).

All components of the circuit (5), printed circuit boards (2), batteries (9), switches (5), (6), (7) and connector (12) may be incorporated in the housing (10). The only part external to the casing (10) is the connector (4) which emanates from the base of the casing (10) and which plugs directly into the unit in which it is going to be used. The removal of the non-conductive upper casing (11) may be used for easy replacement of batteries.

Figure 3:
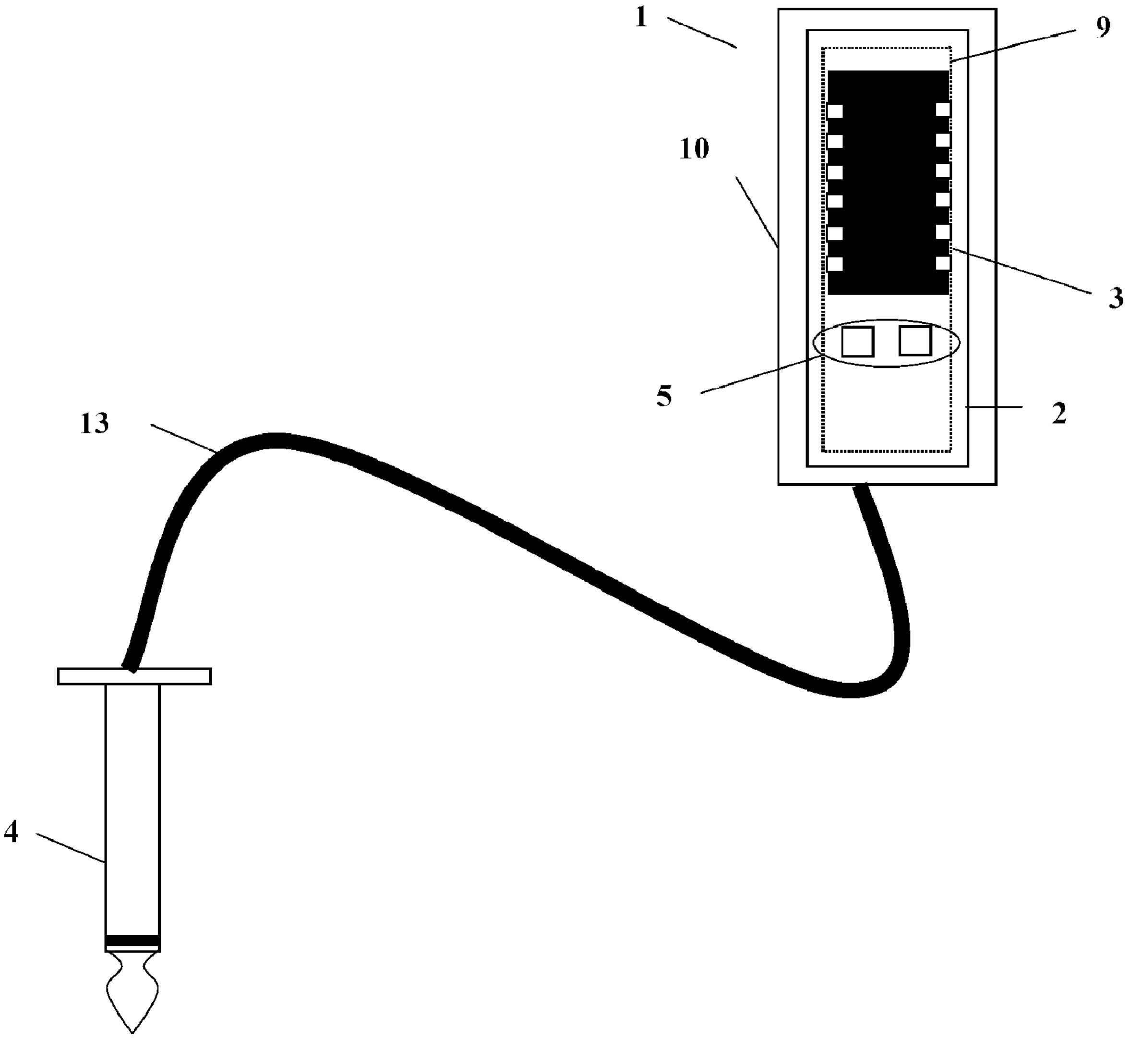
FIG. 3 shows a front perspective view of another embodiment in accordance with the present invention illustrating an audio jack plug with a single chip transceiver system connected to it by means of a cable.

Referring to FIG. 3, a wireless digital audio system may be an interface device (1) consisting in the same components as the one shown in FIG. 1 with the exception that the 6.3" jack plug is now connected to the multilayer Printed Circuit Board (PCB) (2) by means of a cable (13) to improve the handling possibilities of the interface device (1).

Figure 4:
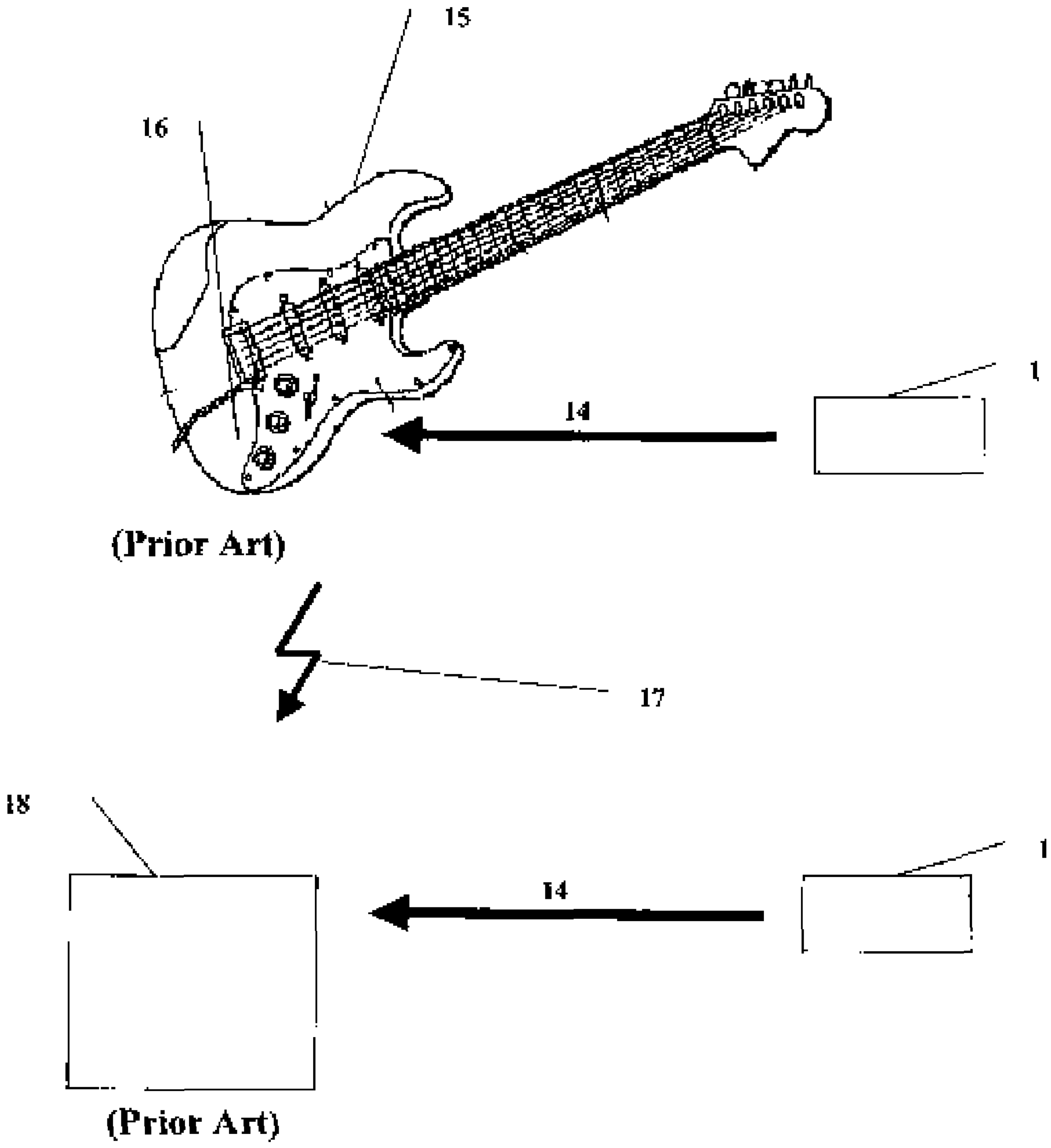

Referring to FIG. 4, a wireless digital audio system may include an interface device (1) connected to a signal-generating device (15) or to a signal-receiving device (18). Interface device (1) may be connected to the signal-generating device (15) or to the signal-receiving device (18) using a standard 6.3, 3.5 or 2.5-mm audio jack-plug or standard 6.3, 3.5 or a 2.5-mm audio jack-socket (14). When connected to the input receptacle of a standard electric guitar of the prior art (16), interface device (1) may transmit an electromagnetic signal to a second interface device (1) that may be connected to a signal-receiving device (18) establishing a wireless link (17) between signal-generating device (15) and signal-receiving device (18). Interface device (1) may digitize the audio signal coming out of the electric guitar, and may transmit an electromagnetic signal representing said audio signal at 2.4 GHz using approximately 100 milliwatts or less of power.

Figure 5:
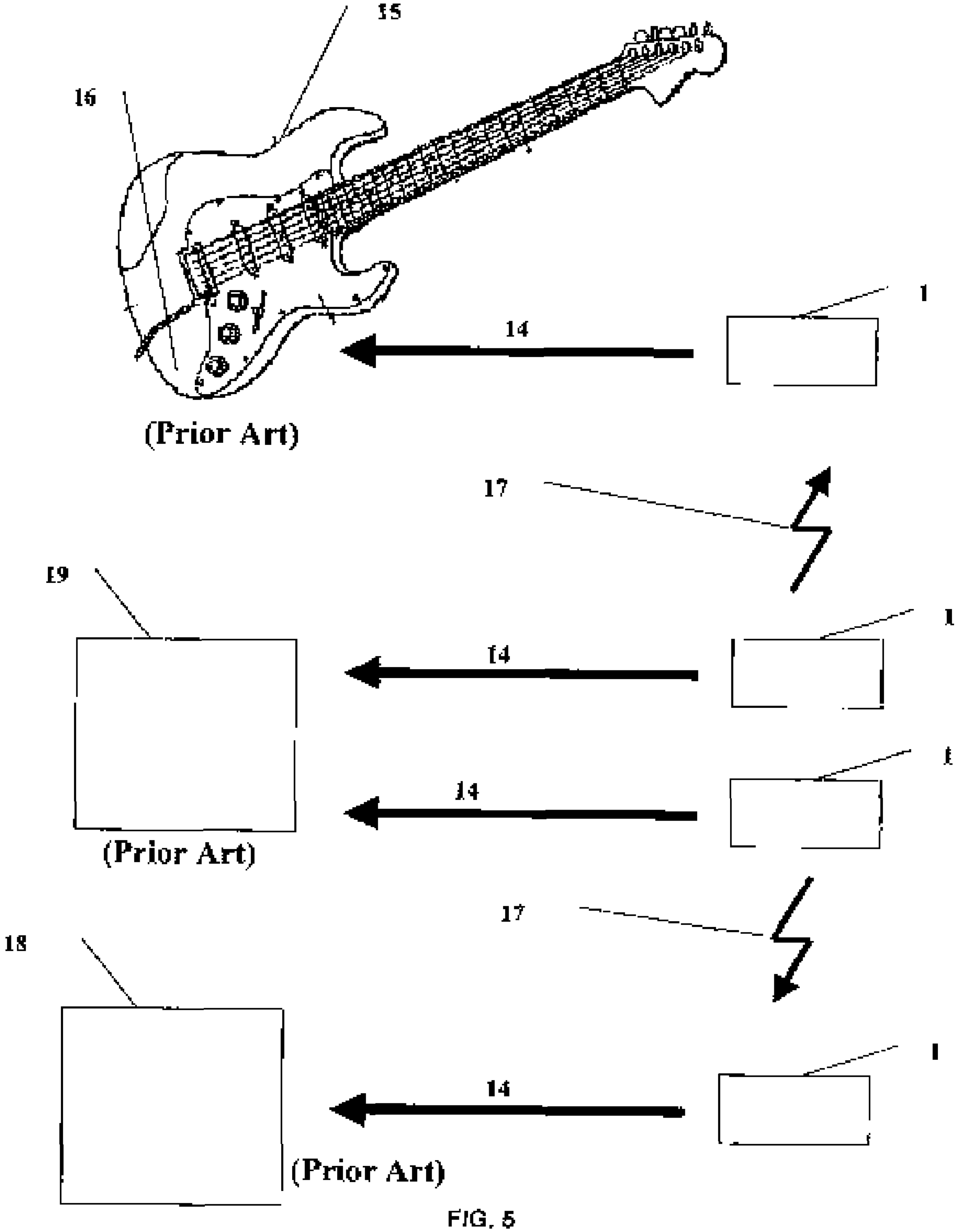
FIG. 5 illustrates a schematic diagram of an embodiment of the interface device of the present invention showing a physical implementation and wireless interconnection of signal-generating and signal receiving devices where the signal-generating devices are an electric guitar and an electric guitar multieffect module typically used to modify the sound of the electric guitar, and the signal receiving devices are said electric guitar effect module and an electric guitar amplifier.

Referring to FIG. 5, a device (19) may receive an audio signal from signal-generating device (15) and it may also transmit a signal to signal-receiving device (18). If device (19) is for instance a guitar multieffect module, it may be a compact device that may be connected to signal-generating device (15) to remain therewith receiving an audio signal from said signal-generating device (15). At the same time, device (19) being for instance said guitar multieffect module, it may be a compact device that may be connected to signal-receiving device (18) to remain therewith transmitting the signal from said signal-generating device (15). Hence, two interface devices (1) will be used together with a device (19), one for receiving an audio signal coming from signal-generating device (15) and a second one transmitting the audio signal coming from said signal-generating device (15) to a signal-receiving device (18).

Figure 6:
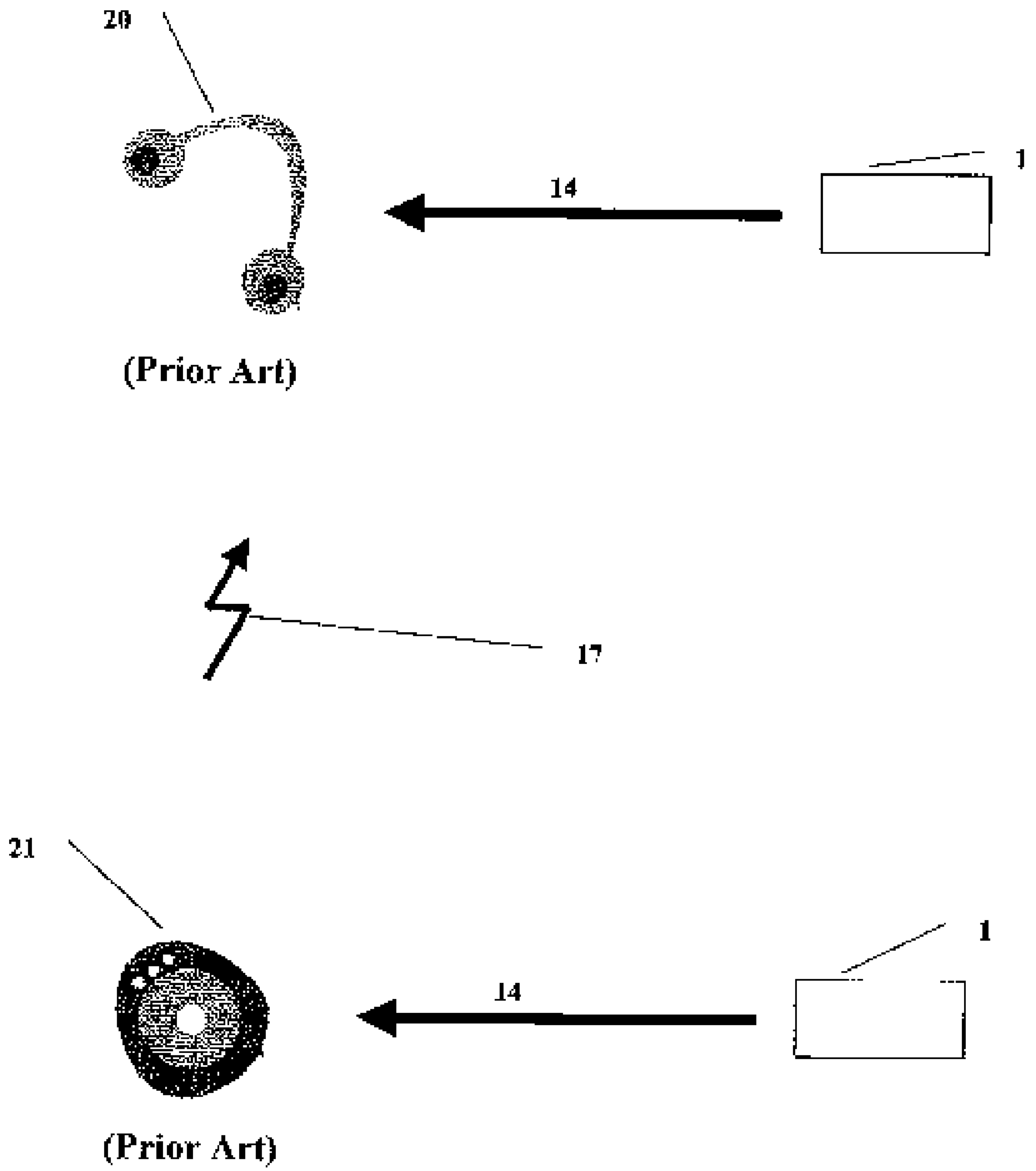
FIG. 6 illustrates a schematic diagram of another embodiment of the interface device of the present invention showing a physical implementation and wireless interconnection of signal-generating and signal receiving device where the signal-generating device is a CD player and the signal-receiving device is a headphone.

FIG. 6 illustrates a schematic diagram of another embodiment of interface device (1) of the present invention showing a physical implementation and wireless interconnection (17) of a signal-generating and a signal receiving device where the signal-generating device is a CD player (21) and the signal-receiving device is a headphone (20).

Figure 7:
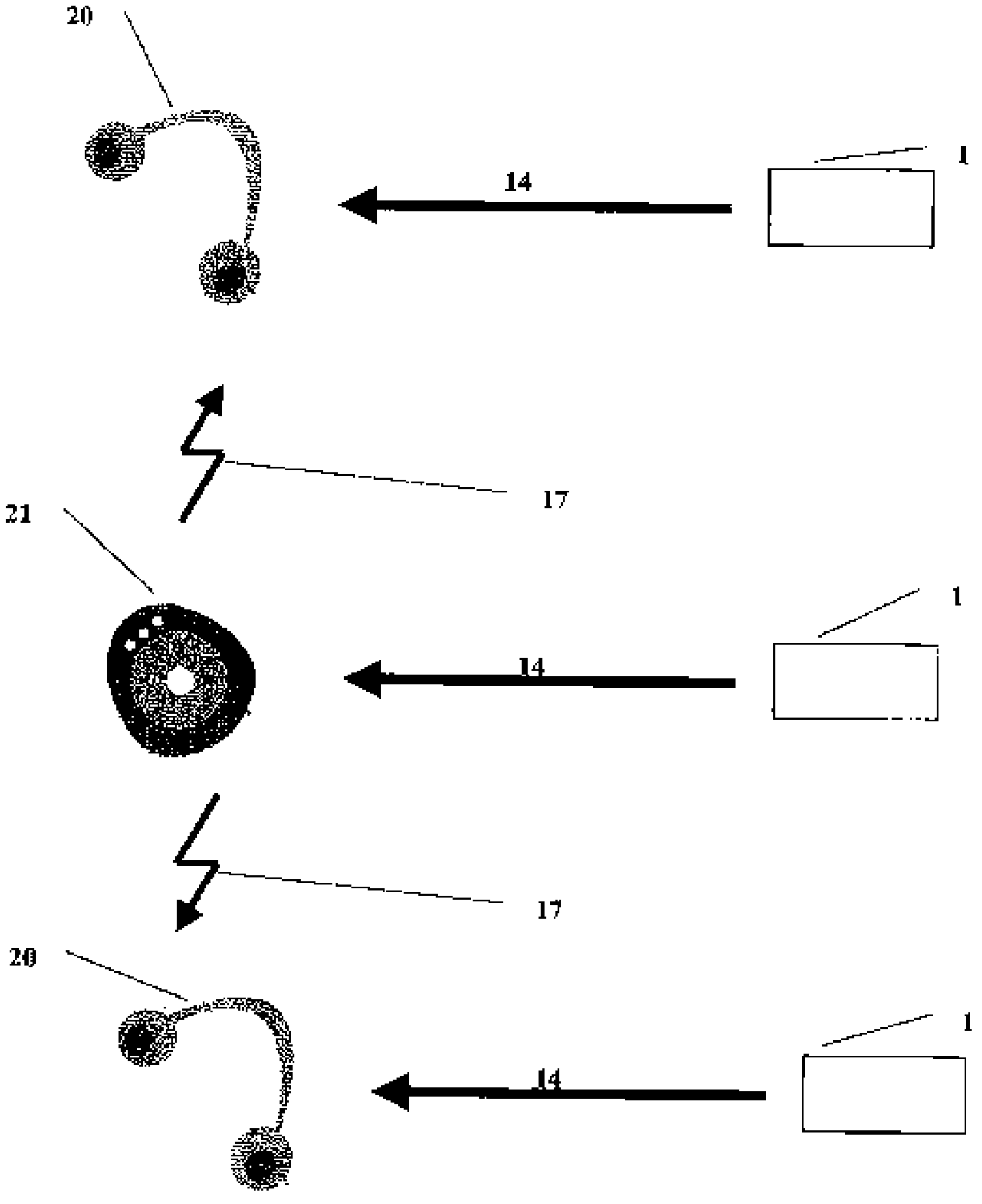
FIG. 7 illustrates a schematic diagram of another embodiment of the interface device of the present invention showing a physical implementation and wireless interconnection of signal-generating and two signal receiving devices where the signal-generating device is a CD player and the signal-receiving devices is are two independent headphones.

FIG. 7 illustrates a schematic diagram of another embodiment of the interface device (1) of the present invention showing a physical implementation and wireless interconnection (17) of signal-generating and two signal receiving devices where the signal-generating device is a CD player (21) and the signal-receiving devices are two independent headphone-sets (20). Interface device (1) may be connected to the signal-generating device (21) or to the signal-receiving device (20) using a standard 6.3, 3.5 or 2.5-mm audio jack-plug or standard 6.3, 3.5 or a 2.5-mm audio jack-socket (14).

Figure 8:
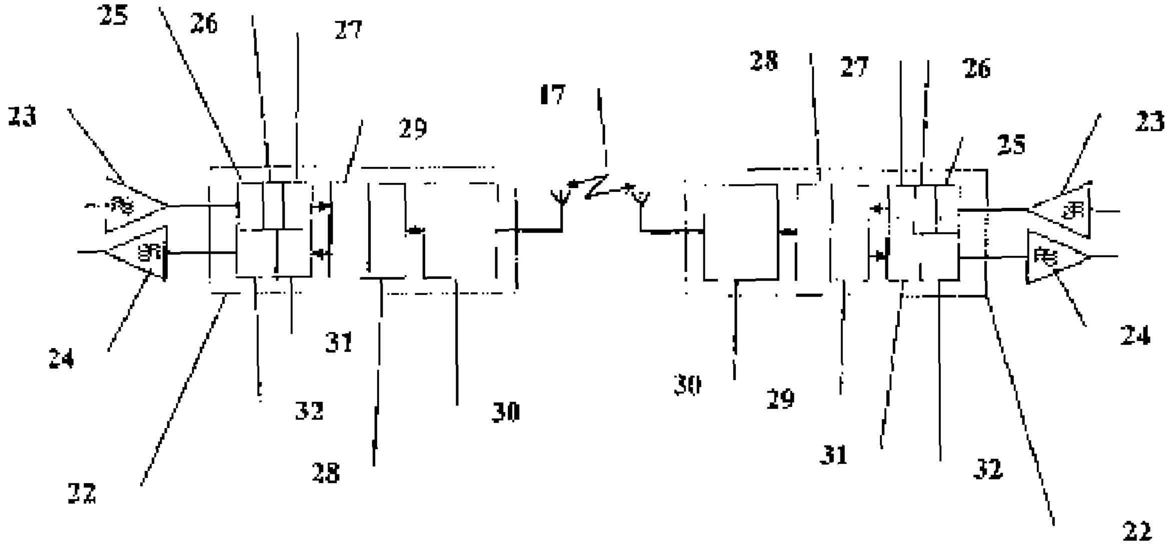
FIG. 8 illustrates the main parts in two identical single chip transceiver boards of the present invention establishing a wireless link.

FIG. 8 illustrates two identical single chip transceiver ICs for audio applications (22). An audio source (15) (or (21)) normally provides an analog output signal in the approximate range of 20 Hz to 20 kHz. The two boards establish a wireless link (17) between an audio signal in the approximate range of 20 Hz to 20 kHz (23) coming from an electric analog audio generating device such as (15) (or (21)), and an audio signal also in the approximate range of 20 Hz to 20 kHz (24) going to an electric analog audio receiving device (18) (or (20)). Each transceiver ICs for audio applications (22) consist in an audio low noise amplifier (25), an audio analog filter (26), an audio Analog to Digital Converter (ADC) (27), MCU (micro-controller unit) (28), DSP (Digital Signal Processor) (29), RF transceiver of the prior art (30), audio Digital to Analog Converter (DAC) (31) and (32) where all this components may be integrated within one single-chip IC. FIG. 8 is used to illustrate the fact that the two single chip transceiver ICs for audio applications (22) used together with the present invention (1) may be identical, which clearly contributes in lowering the final price of interface device (1). One feasible structure of RF transceiver of the prior art (30) to be used together with the present invention (1) is explained in FIG. 10. Each of the single chip transceiver ICs for audio applications (22) illustrated in FIG. 8 corresponds or is the same as single chip transceiver (3) in FIG. 1. Hence, (3) and (22) refer to one and the same device.

Figure 9:
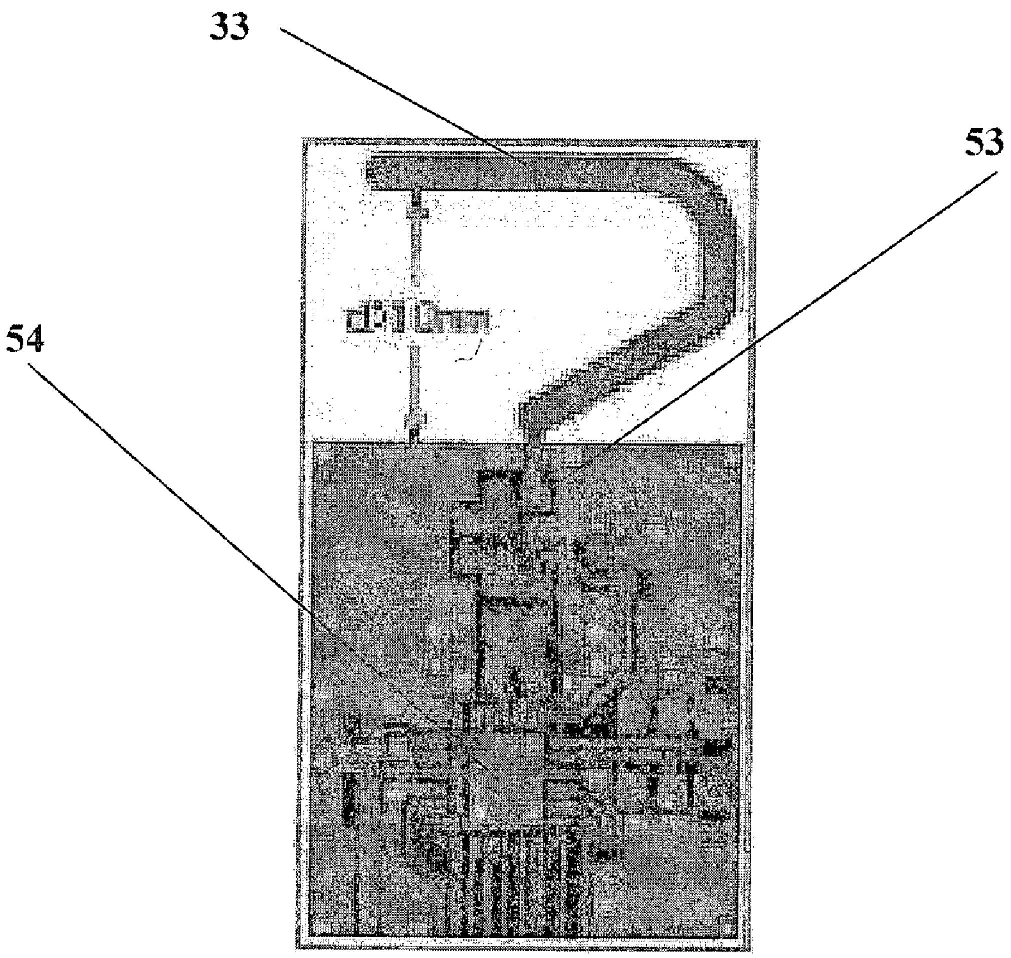
(Prior Art) FIG. 9
FIG. 9 illustrates ¼ monopole antenna printed on a Printed Circuit Board of the prior art.

FIG. 9 illustrates a ¼-monopole antenna (33) of the prior art printed on a PCB that may be implemented in the present invention facilitating its easy of use by avoiding the use of a external cumbersome antenna. When connected to a signal-generating device (15) (or (21)) or to a signal-receiving device (18) (or (20)) using a standard 6.3, 3.5 or 2.5-mm audio jack-plug or standard 6.3, 3.5 or a 2.5-mm audio jack-socket (14), interface device (1) may have an antenna (33) that may be by-directional for transmitting or receiving an electromagnetic signal from/to a similar antenna (33) of a second interface device (1) that may be connected to another signal-generating device (15) (or (21)) or to another signal-receiving device (18) (or (20)) again using a standard 6.3, 3.5 or 2.5-mm audio jack-plug or a standard 6.3, 3.5 or a 2.5-mm audio jack-socket (14).

Figure 10:
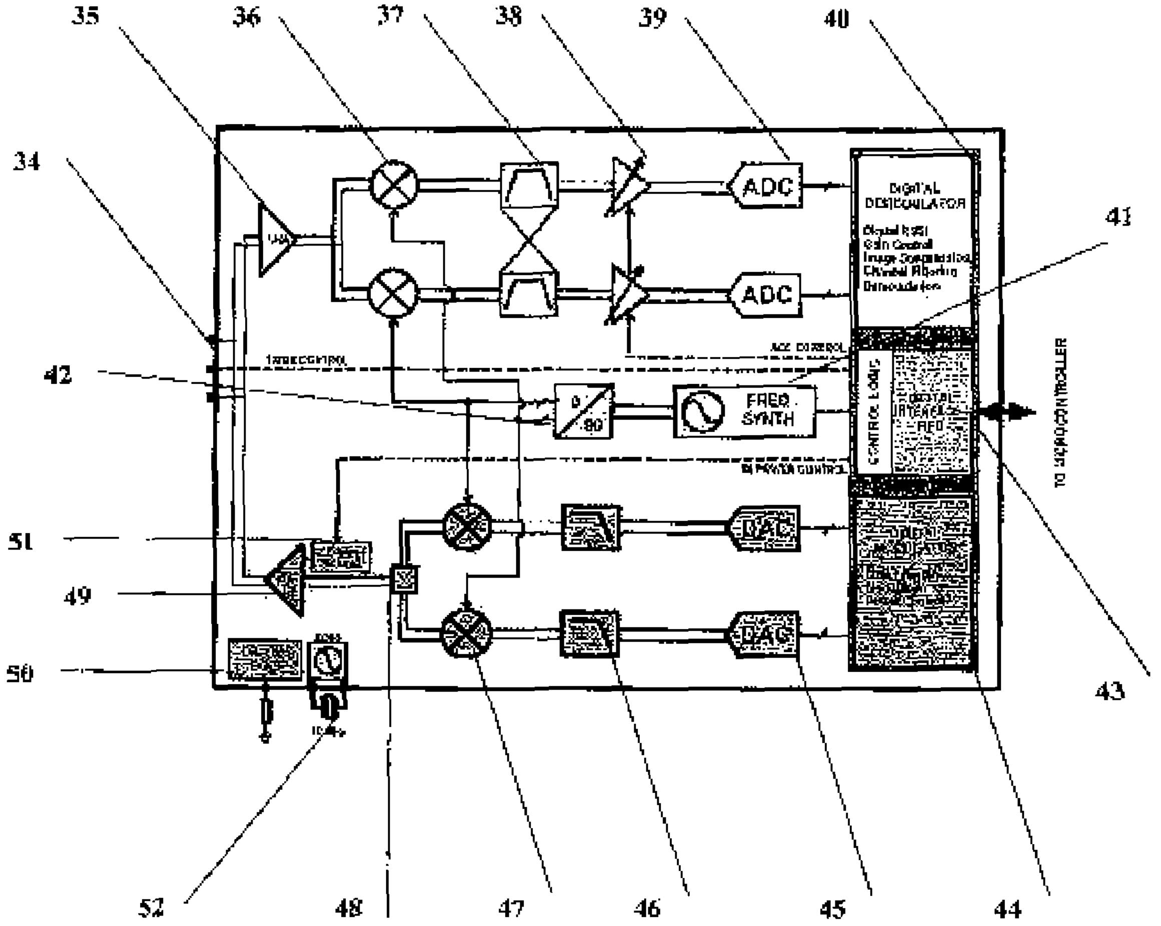
(Prior Art) FIG. 10
FIG. 10 shows a schematic of a single chip transceiver of the prior art that could be used within this application.

Referring to FIG. 10, the incoming signal arriving at antenna (33) may be processed through a duplexer (34) to a RF Transceiver Low Noise Amplifier (LNA) (35), down-converted by a down-conversion mixer (36), communicated to a band pass filter (BPF) (37), gain control unit (38) to then be digitized by a 16-bit (or higher) RF transceiver Analog to Digital Converter (ADC) (39). After conversion of the analog audio signal, the digital signal may be processed by a digital demodulator (40) that will perform tasks such as digital demodulation, digital RSSI, gain control, image suppression, channel filtering, digital filtering to reduce unwanted out of band noise that may have been produced by the Analog to Digital Converter (ADC) (39). The resulting summed digital signal from the receiving summary element may be processed by a demodulator (40) to demodulate the signal elements modulated in the audio transmitter. A, decoder may be used to decode the bits encoded by the channel encoder in the audio transmitter. The resultant processed digital signal may thereby be in condition to represent the original signal processed and transmitted by the audio transmitter. A frequency synthesizer system 41 connected to the 0-90 divider 42, and said 0-90 divider 42 connected to said down-conversion mixer (36) account for the I/Q modulated signal required by the mixer. A digital interface FIFO (first in first out) (43) may be used to pass data to the microcontroller unit (28).

Further referring to FIG. 10, the next step may be to process the digital signal (processed by the microcontroller unit (28) and passed to digital interface FIFO (43)) to return the signal to analog or base band format for use in powering for example a headphone speaker (20) or a standard electric guitar amplifier (18). A RF transceiver Digital to Analog Converter (DAC) (45) may be used to transform the digital signal to an analog audio signal. An analog low pass filter (46) may be used to filter the analog audio signal to pass a signal in the approximate 20 Hz to 20 kHz frequency range and filter other frequencies. Upconversion mixer (47) will convert the signal to a higher frequency to send it over the air. The analog audio signal may then be processed by a power amplifier (49) that may be optimized for powering for example a headphone speaker (20) or a standard electric guitar amplifier (18) to optimize a high quality, low distortion signal for hearing by a user.

Continuing with FIG. 10, the RF transceiver power management can be set into a low power down mode under program control, and also the ADC and RF subsystems can be turned on or off under program control. On chip BIAS (50) and Power Control Unit (51) may be implemented to achieve these tasks. The microcontroller, ADC, DAC and RF front end may run on a crystal oscillator (52) generated clock. A range of crystals frequencies from 4 to 20 MHz may be utilized, but 16 MHz is recommended since it gives best over all performance. The oscillator may be started and stopped as requested by software.

Limits of the present disclosure: Obvious modifications to the circuitry or to the given parameters will become apparent to those skilled in the art and the protection south should be limited only by the spirit and scope of the appended claims.

GENERAL DESCRIPTION

The present invention is directed to wireless analog audio systems for transmission and reception of a signal from an electric analog audio signal-generating device to an electric analog audio signal-receiving device. Examples of electric analog audio signal-generating devices are radio players, tape players, CD players, mp3 players, computers, television audio, electric guitars, electric music keyboards, video cassette recorders (VCR) and the like. Examples of electric analog audio signal-receiving devices are electric-guitar amplifiers, headphones and speaker systems. In the following and for the sake of simplicity, electric analog audio signal-generating devices may be referred to as signal-generating devices, and electric analog audio signal-receiving devices maybe referred to as signal-receiving devices.

An interface device is provided that, when connected to standard audio equipment using for instance industry standard 6.3, 3.5 or 2.5-mm audio jack-plug or 6.3, 3.5 or 2.5-mm audio jack-socket, can interface without gluelogic to virtually any signal-generating or signal-receiving device.

Two or more of these interface devices shown in FIG. 1 and/or FIG. 2, may be used for wireless transmission and reception of audio signals between two (or more) space-separated pieces of audio equipment, in digital format and with CD-quality.

Apart from the few external components, all basic building blocks of the transceiver unit may be integrated within one and the same integrated circuit (IC). Thus, the transceiver may be a single-chip incorporating all necessary elements for wireless transmission and reception of CD-quality audio such as amplification, filtering, mixing and ADC and DAC capabilities on chip. The radio transceiver part of the circuit may be accessed through an internal parallel port and/or an internal SPI. The transceiver may include a fully integrated frequency synthesizer, a power amplifier and modulator units.

An audio transceiver may include a jack plug or a jack socket in communication with an analog low pass filter wherein the jack plug or jack socket may be connectable to a signal-generating device or to a signal-receiving device. In addition to streaming audio the device also boasts a digital control information channel for transfer of control information such as volume, balance, bass and tremble.

The device may be a radio transceiver for the worldwide 2.4-2.5 GHz Industry Scientific and Medical (ISM) unlicensed band. International regulations and national laws regulate the use of radio receivers and transmitters. SRDs (Short Range Devices) for license free operation are allowed to operate in the 2.45 GHz bands worldwide. The most important SRD regulations are EN 300 440 (Europe), FCC CFR47 part 15.247 and 15.249 (USA), and ARIB STDT66 (Japan). The device of the present invention may be compatible with these regulations.

The 2.400-2.483 GHz band is shared by many systems both in industrial, office and home environment. It is therefore recommended to use frequency hopping spread spectrum (FHSS) or a multichannel protocols because the frequency diversity makes the system more robust with respect to interference from other systems operating in the same frequency band. Incorporating an agile frequency synthesizer and effective communication interface, the interface device of the present invention is highly suited for FHSS or multichannel systems. Using the packet handling support and data buffering is also beneficial in such systems, as these features will significantly offload the host controller.

Modulation of the digital signal may be performed using direct sequence spread spectrum communication technology. The transmitted signal from transmit antenna (33) in one interface device (1) may be received by receiving antenna (33) of another interface device (1) and communicated to a duplexer (34). The received spread spectrum signal may then be communicated to a 2.4 GHz direct conversion receiver such as the one shown in FIG. 10. The direct conversion receiver may provide a method for down converting the received signal while utilizing timing and synchronization to capture the correct bit sequence embedded in the received spread spectrum signal. The audio receiver may utilize fuzzy logic (or continuous logic) to optimize performance. The down converted output signal of the direct conversion receiver may be summed in a receiver summing element with a receiver code generator signal. The receiver code generator may contain the same unique code word that was transmitted by the audio transmitter, being specific to a particular a user. Other code words from wireless digital audio systems may appear as noise to a particular audio receiver used in the present invention. This may also be true for other device-transmitted signals operating in the wireless digital audio spectrum used by interface device (1). This code division multiple access (CDMA) may be used to provide each user independent operation. An encoder may be used to reduce intersymbol interference (ISI) by using a transform code to encode the digital signal.

Due to the low-IF I/Q receiver and the on chip complex filtering, the image channel will be significantly rejected. This is important for all 2.4 GHz systems.

Hence, each pair of interface devices of the present invention required for a wireless communication set up (one for transmission and one for reception) may be preset at the factory to communicate in an unambiguously defined way using phase shift keying, CDMA, TDMA and any other digital transmission scheme to avoid interference and cross talking. Advanced frequency hopping scheme and multi-channel systems may be used for robustness and interference avoidance. Further, the invention may use wireless standards such as 802.11 or Bluetooth protocols to prevent collision between adjacent devices. 802.11 has much higher bandwidth than Bluetooth which translates in higher data rate.

Due to the high-speed data rate (4 Mbit/s or higher) of state of the art transceiver devices, several users of several interface devices (1) operated in receiver mode may share one and the same interface device (1) operated in transmitter mode. Hence the interface devices (1) of the present invention may be preset at the factory to establishing a piconet. Switch (8) may be used to determine the transmitting or receiving operational mode of the device (1). This may be interesting for example when several listeners want to hear from one and the same CD player and can clearly contribute in reducing the market price of the interface device (1).

Due to the high-speed data rate (4 Mbit/s or higher) of state of the art devices, several users of several interface devices (1) operated in transmitter mode may share one and the same interface device (1) operated in receiver mode. Switch (8) may be used to determine the transmitting or receiving operational mode of the device (1). Again, the interface devices (1) of the present invention may be preset at the factory to establishing a piconet. This function may be interesting for instance when several musicians want to record music from their instruments into a PC audio card and can clearly contribute in reducing the market price of the interface device (1).

The use of today's commercially available low cost/low power single-chip transceivers for wireless transmission and reception of audio signals, allows the two components needed for wireless audio applications (one for transmission and one for reception) to be interchangeable due to the fact they are exactly the same device, just operated in a different way (transmitting mode or receiving mode). This can clearly contribute in lowering the price of the interface device (1). Switch (8) may be used to determine the transmitting or receiving operational mode of interface device (1) incorporating such transceivers. On the contrary, for example some prior art wireless transmitter systems for electric guitars require a special receiver to be plugged into a standard guitar amplifier. A pair detachable single-chip interface devices (1) of the present invention may be used at one point in time with one audio system, such as the one consisting on a CD-player and a headphone, and at another point in time the same pair of interface devices (1) of the present invention may be used with another audio system, such as an electric guitar and a standard electric-guitar amplifier. Hence, the user does not need to buy a new pair of interface devices (1) for each space separated pair of audio systems he or she wants to establish a wireless connection with. Again, this can clearly contribute in reducing the price of the interface device (1).

The use of the present invention does not require modification of commercially available audio equipment such as headphones, keyboards or electric guitars. It allows them to be operated wirelessly, but it permits the operation of these devices back in a non-wireless mode by means of cables if desired. In other words, it allows conversion between wireless and non-wireless operation mode of audio equipment. For example, another disadvantage of prior art wireless transmitter systems for electric-guitars is that they usually require modification of a standard electric-guitar, i.e. either the entire system, or a portion thereof must be screwed or taped onto the guitar, generally becoming a rather permanent component of the guitar. The device of the preferred embodiment uses a structurally self-supporting transceiver, which is readily detachable from, and easily attachable to any unmodified standard signal-generating or signal-receiving device. No transmitting portion of the evidence has to be attached to the musician's belt or guitar strap, or to the musician's person in any fashion.

The single-chip transceiver interface device (1) being operated in a transmitter mode could be incorporated (embedded) within the body of an electric guitar, electric bass guitar or electrically amplified acoustic guitar whereas the single-chip transceiver interface device (1) being operated in a receiver mode would be a standard device (1) (such as the one's shown in FIG. 1) thus enabling the connection of the wireless guitar with a signal-receiving device such as a guitar amplifier or a PC audio card with a "mic" connection. In a fashion shown in FIG. 3, interface device (1) could be attached to the body of an electric guitar, electric bass guitar or electrically amplified acoustic guitar by means of scrubs or a sticker if desired.

Summarizing, for instance, over US20030118196A1, the present invention offers two mayor advantages. First, the use of transceivers allows for interchangeability between the two components (transmitter and receiver) of a wireless communication system. Second, the present invention can be used in combination with other audio equipment, the receiving module being not necessarily a headphone for example. Third, it does not require previous modification of standard devices.

The complete unit (1) may be very compact, being about the size of an AAA battery, and remains generally stationary after being plugged into the guitar's input receptacle. The use of a low cost/low power single-chip transceiver for digital wireless transmission and reception of audio signals, allows the invention to be very compact. Single-chip transceivers of nowadays 0,13 CMOS technology occupies an area of 6.times.6 mm2 or less. Hence, these devices are perfectly suited to minimize the size of devices tended to adapt conventional non-wireless audio devices into wireless ones, such as the one described here.

Taking the demand for small size, easy fabrication and low cost into account in the development of low-power radio devices for short-range 2.4 GHz applications, a quarter wavelength monopole antenna implemented on the same printed circuit board as the radio module is a good solution. A printed quarter wavelength monopole antenna for 2.45 GHz is very easy to design and can be tuned simply by slight changes in length. No external antenna is required, resulting in compactness of the unit. The resultant transmitting range of the device is very high, in the order of 100 meter, and the signal is remarkably strong and stage due to the digital transmission. When used with standard electric guitars of the prior art, as there are no movable cords, wires or external antennas emanating from the device or attached to the guitar, the effective antenna remains stationary relative to the electric-guitar for stability of signal, which could be affected by movement or changes in static capacitance or inductance between a movable cord, wire or external antenna and musician if a cord, wire or external antenna were used. Hence, the device may be a compact transceiver, which does not incorporate or require any cumbersome external antenna although this could be implemented if required. While the prior art provides cordless electrical guitar systems, there are problems associated with these designs, which the present invention overcomes. For example, prior art devices such as those described in U.S. Pat. Nos. 3,080,785, 3,085,460, 3,296,916, 3,825,666 and 3,901,118 require a wire or inconveniently long antenna be attached either to the guitar or to the musician to act as an antenna for the transmitter. Instability is often a problem in these devices as the antenna, which is subjected to constant movement while in use, can be affected by external elements such as the musician's body, or other nearby objects of a conductive nature. Further, these external antennae are unsightly and can restrict or impede the musician's choreographic performance. Eventually, a Hellix antenna could be used, which reduces the influence of the human body.

Accordingly, the platform of the present invention (1) may be based around powerful 4 Mbit/s datarate wireless RF transceivers using the global 2.4 GHz band, which ensure that there is enough bandwidth to stream and transmit 16-bit 48 Kspls/s CD quality audio without using compression. The invention may assure a Full Quality of Service (QoS) subsystem ensuring optimal system performance by using frequency-hopping schemes and extensive built-in control signaling features between master and slave, retransmit capabilities, connect/reconnect capabilities and several power down modes. It is a unique single chip solution for wireless streaming of crystal clear CD quality mono or stereo audio up to 16-bit 48 kspl/s or higher without using any compression. The invention may also feature input support of up to 24 bit 96 kspl/s or higher. Operating in the global bands such as the 2.4 GHz, the invention offers unrivalled performance and integration coupled with an ultra low solution cost. It provides all Quality of Service (QoS) needed through the use of extensive on-chip hardware and firmware resources, to ensure high quality transmission/reception of audio. The invention features a well balanced design where attention is paid to every detail of the audio interface and the challenging tasks of streaming CD-quality audio with no glitches and degradation in performance in the presence of other disturbing sources such as WLAN, cordless telephones, Bluetooth etc.

The device A/D converters may have 16-bit dynamic range and linearity with a conversion time of 48 CPU instruction cycles per 16-bit result. The reference for the A/D converters may be software selectable between a reference input voltage and an internal bandgap reference. The converter may have 15 inputs selectable by software. Selecting one of the inputs 0 to 15 will convert the voltage on the respective pin. Input 16 may enable the software to monitor the supply voltage by converting an internal input that is VDD/3 with the internal reference selected. The A/D converters are typically used in a start/stop mode. The sampling time is then under software control. The converter may be by default configured as 16 bits. For special requirements, the A/D converters can be configured by software to perform 18 or 24 bit conversions. The converters may also be used in differential mode with one port used as inverting input and one of the other external inputs used as non-inverting input. In that case the conversion time can be reduced to approximately 2.mu·s.

The single chip transceiver IC for audio applications (3) may have one or more programmable PWM outputs, as the alternate function of one or more pins. The resolution of the PWM could be software programmable to 16 bits or higher. The frequency of the PWM signal may be programmable via a 10 bit prescaler from the crystal oscillator. The duty cycle may be programmable between 0% and 100% via one 8-bit register.

The single chip transceiver IC for audio applications (3) port logic may have general-purpose input and general-purpose bidirectional pins. These may be by default configured as GPIO pins controlled by the ports of the microcontroller (28). Most of the GPIO pins can be used for multiple purposes under program control. The alternate functions may include two external interrupts, UART RXD and TXD, a SPI master port, three enable/count signals for the timers and the PWM output.

The platform of the present invention (1) is revolutionary in terms of cost, ease of use, feature set and performance. It uses a transceiver chip designed for streaming audio signals provenient from electrical audio systems such as stringed electrical guitars and electric keyboards or such as CD-players or mp3-players, and with its interfaces and powerful 4 Mbit/s (or higher) radio it constitutes an ideal solution for low power portable audio streaming, as well as stationary HiFi/Surround systems demanding low link delay.

Some audio equipment, such as guitar multieffects, may require both functions i.e. the reception as well as the transmission of electric analog audio signals. This type of devices (guitar multieffects and the like) may thus be considered as an intermediate device between a signal-generating device such as a standard electric guitar and a signal-receiving device such as a standard guitar amplifier of the prior art. Audio equipment such as guitar multieffects will require two interface devices (1), one to wirelessly receive the signal from the electric guitar and a second one to wirelessly send the signal to the amplifier.

The microcontroller instruction timing may be slightly different from the industry standard, typically each instruction may use from 4 to 20 clock cycles. The CPU may be equipped with 2 data pointers to facilitate easier moving of data in the XRAM area. The microcontroller clock may be derived directly from the crystal oscillator (52).

The memory configuration of the microcontroller may have a 256-byte data ram, the upper half only addressable by register indirect addressing. A small ROM of 512 bytes, may contain a bootstrap loader that is executed automatically after power on reset or if initiated by software later. The user program is normally loaded into a 4 k byte RAM from an external serial EEPROM by the bootstrap loader. The 4 k byte RAM may also (partially) be used for data storage in some applications. If the mask ROM option is not used, the program code for the device must be loaded from an external non-volatile memory.

Extremely low peak and average currents for RX (receiving mode) and TX (transmitting mode) may be used. Output power and frequency channels and other RF parameters may be easily programmable by use of a register. RF current consumption may be only 10 mA in TX mode (output power −5 dBm) and 18 mA in RX mode.

The RF transceiver power management can be set into a low power down mode under program control, and also the ADC and RF subsystems can be turned on or off under program control. The CPU will stop, but all RAM's and registers maintain their values. The low power RC oscillator may be running, and so are the watchdog and the RTC wakeup timer (if enabled by software). The current consumption in this mode may be typically b 2.mu·A. The device can exit the power down mode by an external pin (if enabled), by the wakeup timer (if enabled) or by a watchdog reset. For power saving the transceiver can be turned on/off under software control. The device may contain a low power RC oscillator that cannot be disabled, so it will run continuously as long as VDD is applied. RTC Wakeup Timer and Watchdog may be two 16 bit programmable timers that run on the RC oscillator clock. The resolution of the watchdog and wakeup timer is programmable from approximately 300.mu·s to approximately 80 ms. By default the resolution is 10 ms. The wakeup timer can be started and stopped by user software. The watchdog is disabled after a reset, but if activated it cannot be disabled again, except by another reset.

The interface device (1) presented here is not automatically turned on when plugged in. Turn on is made by means of a switch (6) incorporated on the device's housing (10). This helps to save battery power.

The circuitry comprising the few external components (5) of the transceiver module (22), such as the quartz filter (52), may be surface mounted on the upper or lower surface of a printed circuit board (2). Few external components (5) are mainly intended to make pre- and poststages necessary to match the impedance of single chip transceiver (3) with the impedance of the signal generating or signal receiving device in which interface device (1) is used. Hence external components (5) are required to improve audio quality in each application in which interface device (1) is used such as electric guitars, CD-players etc. The device may contain a switch (7) to change between pre or post-stage circuitry used to match impedances of the different type of applications in which the unit is used. Here one of course has a lot of options depending on the cost and physical space available. From simple RC as the cheapest to 5-6 order active filters, off-the shelf switch-cap and dedicated phone line filters can be used.

While the invention has been particularly shown and described with respect to the illustrated and preferred embodiments thereof, it will be understood by those skilled in the art that the foregoing and other changes in form and details may be made therein without departing from the spirit and scope of the invention.

What is claimed is:

1. A wireless audio interface system for digital wireless transmission and reception of an audio signal between an electric analog audio signal-generating and an electric analog audio signal-receiving device, the system comprising: a jack plug or a jack socket in communication with a transceiver module, wherein the system is connectable to a jack plug or a jack socket of the electric analog audio signal-generating and a jack plug or a jack socket of the electric analog audio signal-receiving device, wherein the system functions as a transmitter when connected to the electric analog audio signal-generating and as a receiver when connected to analog audio signal-receiving device; and wherein the electric audio signal-generating device is an electrical music instrument.

2. The wireless audio interface system of claim 1 further comprising an antenna (33), a balun (not shown), a duplexer (34), a power amplifier (49) connected to the duplexer (34), a summating element (not shown), a mixing up-converting element (47), a low pass filter (46), a D/A converter system (45), digital modulator (44), a digital interface to a microcontroller or a DSP (43), an audio codec (not shown) and a pre-stage (5) to adapt the impedance to the electric analog signal generating device (15) (or (21)).

3. The wireless audio interface system of claim 1 further comprising, a low noise amplifier system (35) connected to the duplexer (34), a mixing down-converting element (36) connected to the low noise amplifier system (35), a band pass filter (37) connected to the mixing down-converting element, an A/D converter system connected to the band pass filter, a digital demodulator connected to the A/D converter system, and a post-stage to adapt the impedance to the electric analog signal receiving device.

4. The wireless audio interface system of claim 1 further comprising, a frequency synthesizer system (41) connected to a 0-90 divider (42), and said 0-90 divider (42) connected to mixing elements (36) and (47).

5. The wireless audio interface system of claim 1, wherein all components except an antenna and a duplexer are integrated within a single chip transceiver integrated circuit (22).

6. The single chip transceiver integrated circuit (22) to be used together with the wireless audio interface system of claim 1, the integrated circuit containing an A/D converter system, a D/A converter system, an rf-front end a microcontroller and a DSP (Digital Signal Processor).

7. The transceiver module of claim 6, wherein the Digital Signal Processor (DSP) is used to synthesize effects on the digital audio signal.

8. The transceiver module of claim 6, wherein the Digital Signal Processor (DSP) is used to transmit Musical Instrument Digital Interface (MIDI) to the electric analog audio receiving device.

9. The wireless audio interface system of claim 1, wherein the electric analog audio signal-generating device is an electric guitar, an electric bass guitar, an electrically amplified acoustic guitar, a guitar multi-effect device, or an electric music keyboard.

10. The wireless audio interface system of claim 1, wherein the electric analog audio signal-receiving device is a guitar amplifier, a headphone, a speaker system or a guitar multi-effect device.

11. The wireless audio interface system of claim 1, such that when operated in transmitter mode it is embedded within the body of any electric analog audio signal-transmitting device.

12. The wireless audio interface system of claim 1, such that when operated in receiver mode the system is embedded within the body of any of said electric analog audio signal-receiving devices.

13. The wireless audio interface system of claim 1, wherein the transceiver module transmits the digital audio signal to multiple devices.

14. The wireless audio interface system of claim 1, wherein the transceiver module receives the audio signal from multiple devices.

15. The wireless audio interface system of claim 1, wherein FHSS (Frequency Hopping Spread Spectrum) techniques are used to allow multiple interface devices to operate in a network avoiding collision between adjacent devices.

16. The wireless audio interface system of claim 1, wherein built-in control signaling features include retransmit capabilities, connect/reconnect capabilities and several power down modes.

17. The wireless audio interface system in of claim 1 incorporating an electrical switch to power it on or off.

18. The wireless audio interface system of claim 1 incorporating an electrical switch to choose between a transmitting and receiving broadcasting mode of the device, wherein the switch is in the transmitting mode when connected to the electric analog audio signal-generating device and is in the receiving mode when connected to analog audio signal-receiving device.

19. The wireless audio interface system of claim 1 incorporating an electrical switch to switch between impedance matching circuitry used to match the impedance of the system to the impedance of the signal-generating or signal receiving device.

20. The wireless audio interface system of claim 1, further comprising a jack plug or a jack socket in communication with a transceiver module connected to the electric audio signal-generating device and a jack plug or a jack socket in communication with a transceiver module connected to the electric audio signal-receiving device.

21. The wireless audio interface system of claim 1, wherein the system is interchangeable between the electric audio signal-generating device and the electric audio signal-receiving device.

22. A wireless audio system, comprising: an electric analog audio signal-generating device including a jack plug or a jack socket; an electric analog audio signal-receiving device including a jack plug or a jack socket; a first interface device for digital wireless transmission and reception of an audio signal, comprising a jack plug or a jack socket in communication with a transceiver module connected to the jack plug or the jack socket of the electric analog audio signal-generating device; and a second interface device for digital wireless transmission and reception of an audio signal, comprising a jack plug or a jack socket in communication with a transceiver module connected to the jack plug or the jack socket of the electric analog audio signal-receiving device, wherein the first interface device and the second interface device are interchangeable wherein the system functions as a transmitter when connected to the electric analog audio signal-generating device and as a receiver when connected to the analog audio signal-receiving device; and wherein the electric analog signal-generating device is an electrical music instrument.

23. The wireless audio system of claim 22, wherein the first interface device transmits signals from the audio signal-generating device and the transmitted signals are received by the second interface device of the audio signal-receiving device.

24. The wireless audio system of claim 22, wherein the second interface device is connected to the audio signal-generating device;

the first interface device is connected to the audio signal-receiving device; and wherein the second interface device transmits signals from the audio signal-generating device and the transmitted signals are received by the first interface device of the audio signal-receiving device.

25. The wireless audio system of claim 22, wherein the electric analog audio signal-receiving device is a guitar amplifier, a headphone, a speaker system or a guitar multi-effect device, and wherein the electric analog audio signal-generating device is an electric guitar, an electric bass guitar, an electrically amplified acoustic guitar, a guitar multi-effect device, or an electric music keyboard.

26. The wireless audio interface system of claim 1, wherein the system is limited to one-way communication when connected to the electric analog audio signal-generating device or the electric analog audio signal-receiving device.

27. The wireless audio system of claim 22, wherein the system is limited to one-way communication when connected to the electric analog audio signal-generating device or the electric analog audio signal-receiving device.

* * * * *